United States Patent [19]

Matey et al.

[11] 4,307,419

[45] Dec. 22, 1981

[54] VIDEO DISC SIGNAL SURFACE IMAGING APPARATUS

[75] Inventors: James R. Matey, Mercerville; Carl R. Corson, Trenton, both of N.J.

[73] Assignee: RCA Corporation, New York, N.Y.

[21] Appl. No.: 143,028

[22] Filed: Apr. 23, 1980

[51] Int. Cl.³ .................. H04N 5/76; G11B 27/36
[52] U.S. Cl. ................................ 358/128.6; 360/37; 360/38; 358/106; 358/180; 358/150; 358/244; 369/58
[58] Field of Search ............... 358/127, 128.5, 128.6, 358/96, 150, 244, 106, 107, 139, 180; 179/100.3 A, 100.3 P, 100.1 G, 100.3 G, 100.3 V; 360/37, 38; 356/430, 431, 237; 369/53, 58, 101, 126, 109, 111

[56] References Cited

U.S. PATENT DOCUMENTS

| | | | |
|---|---|---|---|
| 2,992,293 | 7/1961 | Cameron | 358/96 |
| 3,176,306 | 3/1965 | Burns | 358/106 |
| 3,366,733 | 1/1968 | Frohbach | 358/128.6 |
| 3,526,715 | 9/1970 | Cagle | 358/150 |
| 3,819,874 | 6/1974 | Fujio | 179/100.3 A |
| 3,878,335 | 4/1975 | Balaban | 358/150 |
| 4,002,824 | 1/1977 | Petrocelli | 358/180 |
| 4,030,835 | 6/1977 | Firester | 356/237 |
| 4,096,530 | 6/1978 | Plugge | 358/244 |
| 4,124,871 | 11/1978 | Morrin | 358/96 |
| 4,155,098 | 5/1979 | Roach | 356/237 |

Primary Examiner—Alan Faber
Attorney, Agent, or Firm—E. M. Whitacre; J. S. Tripoli; R. G. Coalter

[57] ABSTRACT

A synchronous pulse generator responsive to a set condition of a memory produces a burst of N timing pulses within a period of time T for each M revolutions of a video disc player turntable. The timing pulses are converted to an analog voltage for application to the vertical drive circuit of an imaging device which receives one horizontal control signal for each burst. Feedback circuitry resets the memory when the number of pulses produced reaches a predetermined value whereby each time the memory is set a raster of constant height is formed having a line resolution dependent upon selection of the parameter N. The parameter M may be independently selected for controlling an effective vertical field of view represented by the displayed image. A video signal reproduced by the player may be added to the analog voltage for producing a contourgram of a selected segment of a disc being played or used for Z-axis modulation of the imaging device for producing gray scale images. In either case the resultant images represent dynamic interactive relationships between the disc being played and an associated pickup transducer over a predetermined area of the disc.

7 Claims, 3 Drawing Figures

VIDEO DISC SIGNAL SURFACE IMAGING APPARATUS

This invention relates to apparatus for producing a raster scanned image of a predetermined area of the signal surface of a video disc record.

As used herein, the term "signal surface" means that portion of the disc where information would normally be recorded. For optical discs, the signal surface may be internal to the disc whereas for capacitance type discs it may coincide with the external or upper physical surface. The signal surface or "information track" may be either silent (i.e., unrecorded) or encoded (i.e., recorded with an appropriate signal carrier).

Video disc records which store wideband signals (e.g., digital data or television signals) in some form (e.g., optical transmission or reflection characteristics, capacitance variations, etc.) have been proposed.

In the manufacture of such discs it is useful to characterize features of the disc which affect its playback performance. Such features often extend over two or more grooves. Because of the high information density of the disc it is difficult to separate information associated with these features from the other information on the disc via conventional electronic means, such as spectrum analysis. This difficulty arises in part from a failure to recognize that the disc has a two-dimensional signal surface, although the information stream derived from the disc is a one dimensional time series.

Optical microscopy techniques can be applied to the signal surface of the disc, but diffraction effects and depth of field limitations present formidable difficulties, since signal wavelengths may be on the order of 5000 angstoms and signal amplitudes as shallow as 80 angstroms. These problems are aggravated by the presence of disc warp and, in some systems, guide grooves which present variations of the signal surface much larger than the signal amplitude.

Electron microscopy can overcome the diffraction and depth of field difficulties at the expense of a limited field of view. A further drawback of the electron microscope is that preparation of a specimen from the disc normally requires cutting the area of interest out of the disc. This effectively precludes tests in which one would play the signal surface after inspection.

A further difficulty of both optical and electron microscopy is that they can present a great number of extraneous features which are not important to playback performance and which tend to obscure features which do affect the playback performance.

One can, of course, simply play the disc and observe the performance on a conventional video monitor. However, the complex signal processing required to decode the stored information tends to obscure the physical nature of the signal surface features which are responsible for the playback performance.

The present invention is directed to meeting the need for apparatus for producing "mappings" or images of areas of the signal surface of a video disc record for analysis of disc parameters such as pattern defects, surface noise in silent and encoded information tracks, carrier level variation over large disc areas, effects of bounce of contact type pickup transducers, etc. An object of the invention is to provide imaging apparatus having high resolution and great depth of field, which is nondestructive to the disc being inspected and which is insensitive to features of the signal surface which do not affect playback performance of the disc (e.g., the disc warp). This object, in other words, is to achieve the benefits characteristic of both optical and electron microscope inspection techniques but without the attendant disadvantages of such inspection techniques.

As will be explained, one may readily correlate the mappings or images with the physical surface of the disc and in so doing obtain information heretofore obtainable only with great difficulty, if at all.

In accordance with a first aspect of the invention, apparatus for producing a raster scanned image of a predetermined area of the signal surface of a video disc comprises a video disc player means including a turntable for rotating the video disc and pick-up transducer means for producing an output signal representative of an information track of the disc. A turntable rotation sensing means is mounted on the player means in a position proximate to the turntable for producing a signal manifestation corresponding to each revolution of the turntable. A scan generator means responsive to the signal manifestations of the sensing means and to the output signal of the transducer means produces a raster scan signal manifestation of a selected area of the disc. Image display means responsive to the raster scan signal manifestation produces a raster scanned image of the selected area. Circuit means are provided in the scan generator means for controlling the raster line resolution in accordance with a first control signal manifestation and for controlling the effective field of view of the raster scanned image in accordance with a second control signal manifestation.

In accordance with another aspect of the invention, the scan generator comprises pulse generator means responsive to an enabling signal supplied thereto for producing a burst of N timing pulses within a period of time T for each M revolutions of the turntable, M and N being controllable integers, T being less than the rotational period of the turntable. The timing pulses are supplied to a sweep generator means which includes a resettable integrator means for producing an analog output voltage proportional to the number of timing pulses produced by the pulse generator means and limiter means for limiting the output voltage to a predetermined value. Control circuit means responsive to a start signal supplied thereto supplies the enabling signal to the pulse generator means and in response to activation of the limiter means terminates the enabling signal and resets the integrator means.

The above and further features of the invention are described in detail hereinafter and illustrated in the accompanying drawings wherein.

Figure 1:
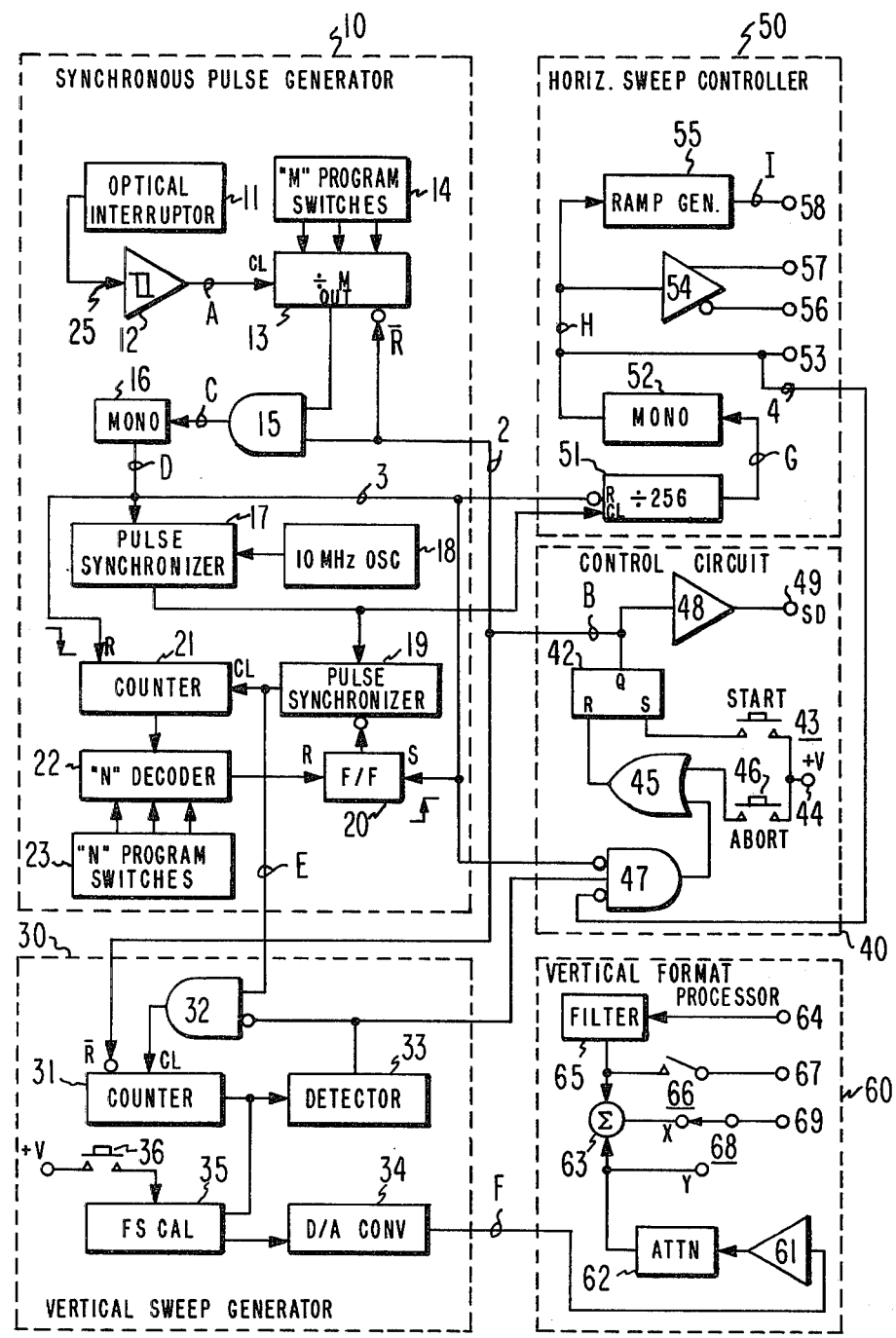
FIG. 1 is a block diagram of a scan generator embodying the invention.

The scan generator of FIG. 1 is intended for use with a video disc turntable for producing scan control signals for application to an oscilloscope to create a raster which can be used to generate a representation of a predetermined area of a video disc. The raster scan may be Z-axis modulated with video signals recovered from the disc for producing gray scale images representative of the signal surface of the area scanned under dynamic conditions or it may be Y-axis modulated for producing contour mappings of the signal surface. Highlighted contour mappings may be obtained by a combination of Z and Y axis modulation. As used herein, the term signal surface means the portion of the disc where information would normally be recorded. For optical discs, the signal surface may be internal to the disc whereas for capacitance type discs it may coincide with the external or upper physical surface.

As will be explained, it is a feature of the invention that the raster line resolution may be varied and the relationship between each raster line and the information tracks on the disc is also variable whereby the image resolution and effective field of view of the image may be independently controlled. Variation of the raster/track relationship gives an effect somewhat like that of a zoom lens. The combination of these features has a synergistic effect in that it greatly enhances the speed and accuracy of analysis of disc parameters such as pattern defects, surface noise in silent and encoded information tracks, carrier level variation over large disc areas, effects of bounce of contact type pickup transducers, etc.

The scan generator comprises a synchronous pulse generator 10, a vertical sweep generator 30, a control circuit 40, a vertical format processor 60 and a horizontal sweep controller 50. As will be explained subsequently, the combination of the first three above-mentioned elements, in addition to providing the variable field of view and variable raster resolution features previously mentioned, also provides the further feature of producing a vertical drive output voltage which varies between preset independent limits. This further enhances the ability to rapidly scan a video disc since no further adjustment of vertical gain is necessary after initial calibration. This, in turn, provides the benefit of enhancing the uniformity and repeatability of image production.

Synchronous pulse generator 10 comprises an optical interruptor module 11 having an output coupled via a Schmitt trigger circuit 12 to the clock (CL) input of a programmable divider 13 which is programmed by means of a set of program switches 14 coupled to its programming inputs. The purpose of module 11 is to produce a single output pulse for each revolution of the turntable. This may be facilitated by mounting the module on the turntable base proximate to the turntable and connecting an opaque "flag" on the perimeter of the turntable so as to interrupt the internal light source of the module once each revolution. A suitable interruptor module is the model H13B made by the General Electric Company. Alternatively, one may use magnetic or other forms of sensors if desired. The function of Schmitt trigger 12 is to provide hysteresis for rejection of noise which may be present at the output of module 11 during switching transitions whereby it is assured that only a single pulse per revolution of the turntable is supplied to divider 13 and also to reduce pulse jitter.

Programmable divider 13 has an output coupled to one input of AND gate 15 and an active low reset input R̄ coupled to the other input of gate 15 and to bus 2. Active low inputs and outputs are signified in the drawing by circles. The purpose of divider 13 is to control the effective "field of view" of the overall system by producing a single output pulse (output of gate 15) for each M pulses produced at the output of Schmitt trigger 12.

As an illustration, if M equals unity then upon each rotation of the turntable one pulse will be produced at the output of gate 15. This pulse, as will be explained, will cause one horizontal line to be scanned by the oscilloscope and so each revolution of the disc will correspond on a one-to-one basis with each of the raster lines. This condition represents the smallest field of view of the area on the disc being scanned. To obtain a larger field of view one need only increase the value of M so that pulses are skipped. For example, if M is set to eight then every eighth convolution of a recorded spiral information track on the disc will correspond to a single horizontal scan line on the oscilloscope. Accordingly, the vertical dimension of the resulting scope display will represent a radial dimension of an area on the disc eight times as large as when M is set to unity.

Bus 2 provides the means for enabling and inhibiting operation of pulse generator 10. When a high level signal is applied to bus 2 gate 15 is primed and the reset level signal is removed from divider 13. Conversely, when bus 2 is low, gate 15 is disabled and divider 13 held in a reset condition.

The pulses produced at the output of gate 15 are "stretched" by means of monostable multivibrator 16 which controls bus 3. When multivibrator 16 is in its quasistable state bus 3 is held high thereby enabling a pulse synchronizer 17 to supply 10 MHz pulses produced by an oscillator 18 to a second pulse synchronizer 19 which, in turn, synchronizes the pulses with the output of a flip-flop 20. The purpose of the first pulse synchronizer is to assure that the 10 MHz pulses gated by bus 3 are not truncated at transitions of the bus 3 voltage thereby preventing the possibility of miscounting partial pulses by a counter in the horizontal sweep controller 50. The second pulse synchronizer also prevents 10 MHz pulse truncation at transitions of the output of flip-flop 20 so that no "partial" pulses are supplied to a counter 21 connected to the output of synchronizer 19. An integrated circuit containing a pair of pulse synchronizers suitable for use in generator 10 is the type SN74120.

The output of counter 21 is supplied to a decoder 22 controlled by program switches 23. When the count in counter 21 reaches the value set by program switches 23 the decoder 22 supplies a reset signal to flip-flop 20 which disables pulse synchronizer 19 and therefore, stops counter 21. Counter 21 is reset by negative transitions and flip-flop 20 is set by positive transitions of the bus 3 voltage. Accordingly, a burst of pulses is produced by pulse synchronizer 19 upon each triggering of monostable multivibrator 16, the number (N) of pulses produced being controlled by the setting of program switches 23. If, for example, N is set to unity then a single pulse will be produced by synchronizer 19 each time multivibrator 16 is triggered. If N is set to eight then eight pulses would be produced.

It is a feature of the invention that variation of the parameter N by means of switches 23 allows control of the number of raster scan lines produced by the scan generator without affecting the height of the raster. This feature is realized by the steps of producing an analog voltage proportional to the number of timing pulses produced, limiting the voltage to a predetermined level and then disabling the pulse generator when the limit is reached.

Vertical sweep generator 30 provides the functions of pulse-to-voltage conversion and limiting described above. Generator 30 comprises a counter 31 having a clock input (CL) coupled to the output of synchronizer 19 via an inhibit gate 32 which in turn is controlled by a detector 33 coupled to the counter output. Detector 33 in combination with inhibit gate 32 functions as a means for limiting the count in counter 31 to a predetermined value and, in so doing, also limiting the output voltage of a digital to analog converter 34 coupled to the counter output. For calibration purposes a calibration circuit 35 is included in the connection between counter 31 and converter 34 for applying a full scale digital signal manifestation (e.g., all "ones") to the converter in response to closure of a push button switch 36. Circuit 35 may comprise a group of OR gates which apply a logic 1 level voltage (+V) to each input of converter 34 when switch 36 is closed. Alternatively, circuit 35 may be omitted if counter 31 is of a type having JAM inputs. If so, switch 36 would then be connected to the counter JAM enable input.

In operation of the portion of FIG. 1 described thus far, a high level signal on bus 2 causes generator 30 to produce a burst of N timing pulses for each M revolutions of the turntable as previously described. The high level signal on bus 2 removes the reset signal $\overline{R}$ (active low) from counter 31 whereby counter 31 begins to count the timing pulses passed by inhibit gate 32. D/A converter 34 then converts the count in counter 31 through unit 35 (i.e., the integral of the timing pulses) to an analog voltage for controlling the vertical sweep of the oscilloscope (not shown). When the count reaches a predetermined maximum value (e.g., all ones) detector 33 supplies an inhibit signal to gate 32 which prevents further counting and thus limits the analog output voltage. The inhibit signal is also supplied to control circuit 40 which, after a delay sufficient to allow completion of the last horizontal sweep of the raster, clamps bus 2 to a low level thereby disabling the pulse generator and resetting the vertical sweep integrator (counter 31).

The feature of delayed resetting of counter 31 is advantageous for two reasons. First it insures that the last line of the raster corresponds to the full scale output of D/A converter 30. If counter 31 were immediately reset upon reaching its full scale count then there would be insufficient time for conversion of the count to the full scale voltage or for completion of the last raster scan. The raster, in other words, would be one line short of the full scale capability of the D/A converter and thus there would be incomplete utilization of the maximum converter dynamic range. Second, delayed resetting insures that vertical retrace lines do not appear in the raster which are particularly objectionable in photographic records of a scan. Little delay is needed to obtain these advantages. A satisfactory delay would be equal to or greater than the sum of (1) the maximum burst length plus (2) the settling time of converter 34 plus (3) the horizontal sweep time of the oscilloscope.

Control circuit 40 controls bus 2 and thus the operation of pulse generator 10 and vertical sweep generator 30. Circuit 40 comprises a flip-flop 42 having a true (Q) output coupled to bus 2, a set input (S) coupled via a start switch 43 to supply voltage point 44 for receiving a voltage +V and a reset input (R) coupled via an OR gate 45 and an "abort" switch 46 coupled to point 44. An input of OR gate 45 is also coupled to the output of a three input gate 47 which is enabled by the simultaneous presence of (1) a high level signal from the output of detector 33, (2) a low level signal on bus 3 and (3) a low level signal on bus 4 which is the output of a horizontal trigger or blanking circuit in horizontal sweep controller 50. A buffer amplifier 48 is included in control circuit 40 between the Q output of flip-flop 42 and a shutter drive (SD) output terminal 49. The purpose of amplifier 48 is to supply an enabling signal to the shutter solenoid of a camera for photographing the oscilloscope images.

Horizontal sweep controller 50 comprises a cascade connection of a divider 51 and a monostable multivibrator 52. The divider is reset by a low level signal on bus 3 and enabled to count the 10 MHz pulses produced by pulse synchronizer 17 when the bus 3 signal level is high. Divider 51 is set to divide by 256 and thus serves as a delay element for triggering monostable multivibrator 52 a predetermined time (in this case 25.6 microseconds) after multivibrator 16 is triggered. The purpose of this delay is to assure that the horizontal sweep of the oscilloscope (controlled by multivibrator 52) does not begin until two conditions are met, namely (1) counter 31 has reached the count it is programmed for and (2) D/A converter 34 has had sufficient time to settle. Since converter 34 controls the vertical sweep of the oscilloscope, delayed triggering of multivibrator 52 until the voltage of converter 34 has stabilized assures that the horizontal raster lines are not distorted. Stated another way, delayed triggering prevents the appearance of vertical sweep lines between each horizontal scan line.

Multivibrator 52 controls bus 4 which is connected to a horizontal trigger output terminal 53, a blanking amplifier 54, a horizontal sweep generator 55 and to an active low input of gate 47 in control circuit 40. Each time multivibrator 52 is triggered bus 4 goes high whereby gate 47 is inhibited, a trigger signal is produced at terminal 53, complementary blanking signals are produced at the output terminals 56 and 57 of blanking amplifier 54 and a horizontal sweep voltage (e.g., a sawtooth ramp) is produced at the output terminal 58 of the horizontal sweep generator.

The purpose of inhibiting gate 47 during the time multivibrator 52 is in its quasi-stable state is to assure (as previously mentioned) that the last line of the raster is completed before the run memory (flip-flop 42) is reset so that no vertical retrace line appears in the raster. If the raster generator is used with an oscilloscope having an external trigger input and an internal time base, terminal 53 would be connected to the trigger input of the oscilloscope, then sweep generator 55 and blanking amplifier 54 could then be omitted. Alternatively, if the oscilloscope does not have an external trigger input one would connect terminal 58 to the oscilloscope horizontal sweep (X-axis) input and an appropriate one of terminals 56 and 57 to its blanking (Z-axis) input to provide blanking between horizontal sweep intervals.

Vertical format processor 60 provides means for controlling the level of the vertical sweep voltage produced by generator 30 and for selecting the image format (gray scale or contourgram). Processor 60 includes a buffer amplifier 61 having an input coupled to the output of converter 34 and an output coupled via an attenuator 62 to an input of summing circuit 63. A video input terminal 64 is coupled via a filter 65 to the other input of summing circuit 63. A single pole single throw switch 66 is coupled between the output of filter 65 and a Z-axis output terminal 67. A single pole double pole switch 68 is arranged to couple the output of attenuator 62 to a vertical drive output terminal 69 in one position (Y) and to couple the output of summing circuit 63 to terminal 69 in its other position (x).

To produce a gray scale image, terminal 64 is connected to the output of the turntable pick-up transducer, switch 66 is closed, terminal 67 is connected to the Z-axis or intensity modulation input of the oscilloscope, switch 68 is set at position Y and terminal 69 is connected to the vertical amplifier of the oscilloscope. For contour images switch 68 is set in position X whereby a portion of the video signal recovered from the disc is added to the vertical drive signal via summing circuit 63. One may "highlight" the contour image by closing switch 66 if desired or it may be left open. Where the video signal contains abrupt transitions the change in beam velocity may cause objectionable dark spots to appear in the raster. Closure of switch 66 provides compensation for such an effect by increasing the oscilloscope beam current when rapid transitions of the video signal occur.

The inclusion of filter 65 in processor 60 allows one to make gray scale or contour images which may be related to specific frequencies or frequency bands of the reproduced signal. By this feature one may determine if a given defect or blemish on the disc results in a uniform or non-uniform change in the transducer output signal. Some defects, for example, may be of a nature as to only affect the high frequency signal content while others may cause complete loss of signal.

Images useful for diagnostic purposes may be produced by coupling terminal 64 to a source of signal other than the transducer output (e.g., video). As an example, where the transducer is servo controlled one may apply the servo signal to terminal 64 and thereby produce images relating the servo system performance to defects on specific areas of the disc being inspected. As used herein the term "video" signal is meant to include video related signals such as, reproduced audio signals, servo mechanism tracking signals, etc.

Figure 2:
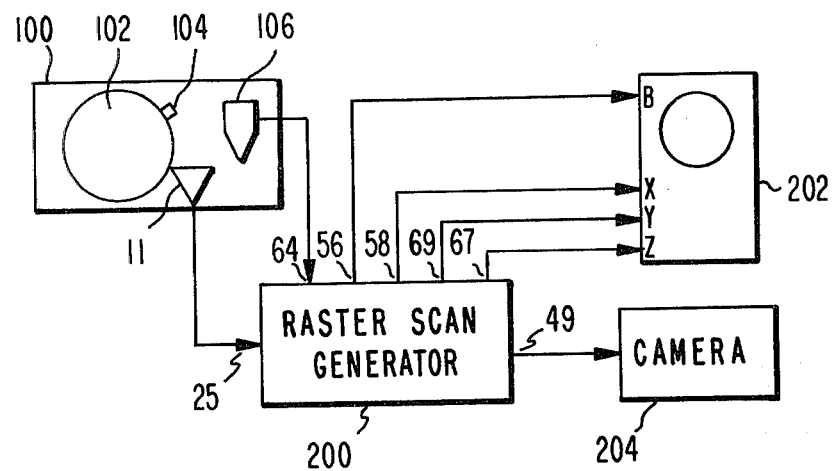
FIG. 2 is a block diagram of a video disc scanning apparatus employing the scan generator of FIG. 1 and embodying the invention.

FIG. 2 illustrates a specific application of the invention wherein the scan generator of FIG. 1 (200 in FIG. 2) is used with a non-triggered or "X-Y" type of oscilloscope 202 equipped with a camera 204 which preferably has an electronic shutter release (e.g., a shutter solenoid). A suitable oscilloscope is the Tektronix Model 7904 and a suitable camera in the Tektronix Model C-50. Terminals 56, 58, 69 and 67 of generator 200 are connected, respectively, to the blanking input (B), X-axis input (X), Y-axis input (Y) and Z-axis input (Z) of oscilloscope 202. The shutter drive output terminal 49 of generator 200 is coupled to the shutter solenoid of the oscilloscope camera 204.

Timing signals for generator 200 are obtained by mounting optical interruptor 11 on video disc player 100 in a position proximate to the rim of turntable 102. An opaque flag 104 is attached to the rim in a position to interrupt the internal light source of interruptor 11 whereby pulses are produced at the turntable once-around frequency and supplied to the input 25 of Schmitt trigger 12 in generator 200. The output of the player pickup transducer 106 is coupled to the video input terminal 64 of vertical format processor 60 in generator 200.

Transducer 106 may be of the capacitance, light or pressure responsive type depending on the disc to be scanned and includes suitable circuitry for providing the necessary stimulus-to-voltage (or current) conversion. As an example, for an optical disc the transducer may comprise a photo transistor (array) coupled to an amplifier. For a capacitance type disc the transducer may comprise a capacitance sensing electrode coupled to a driven resonant circuit and a detector for producing an FM signal representative of changes in the resonant circuit frequency due to disc-electrode capacitance variations. Another alternative would be a piezoelectric or pressure responsive transducer.

Figure 3:
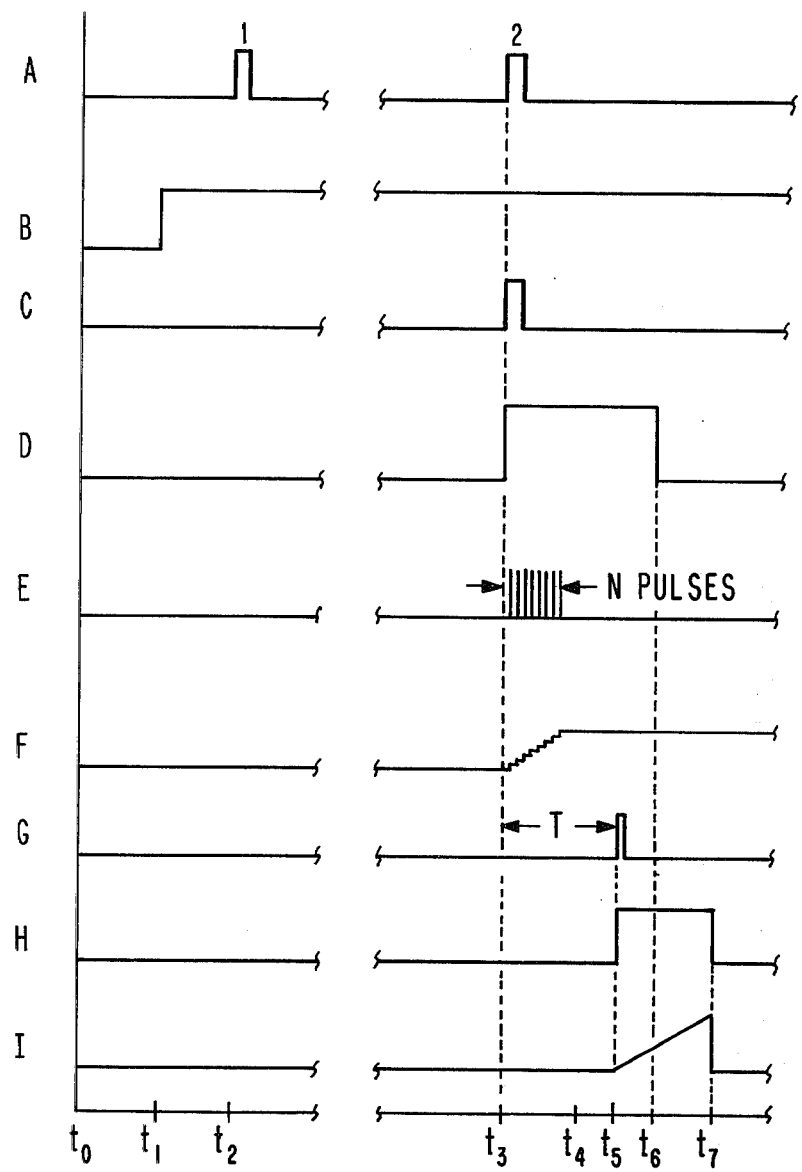
FIG. 3 is a waveform diagram illustrating certain aspects of operation of the scanning apparatus of FIG. 2.

The waveforms of FIG. 3 illustrate operation of generator 200 in FIG. 2 for a specific case where M is set equal to two and N is set equal to eight for producing gray scale images of a segment of the surface of a video disc rotated by turntable 102. The parameters M and N are controlled by program switches 14 and 23 in generator 200 and gray scale images are obtained by closing switch 66 and setting switch 68 in position Y in the vertical format processor 60. It will be assumed, for purposes of discussion, that counter 31 is a 10 bit counter and that detector 33 is set to detect an "all ones" or full scale condition of the counter (i.e., decimal 1023).

The waveforms labeled A-I correspond to the signal conditions at like identified points in FIGS. 1 and 2. The time scale is broken between times $t_2$ and $t_3$ to provide an expanded view of waveform changes which occur upon the second revolution of the turntable 102 after flip-flop 42 is set. It will be assumed initially (time $t_o$) that all counters, dividers, and flip-flops are in a reset condition and that all multivibrators are in their stable states.

At time $t_1$ flip-flop 42 is set by closure of START push button switch 43. This causes the bus 2 voltage (waveform B) to assume a high level thereby priming gate 15, enabling divider 13 and opening the shutter of the oscilloscope camera 204.

At time $t_2$ the first pulse ("1" of waveform A) produced by interruptor 11 and Schmitt trigger 12 after setting of flip-flop 42 is counted in programmable divider 13. Divider 13, it will be recalled, is programmed by switches 14 to divide by two. Accordingly, gate 15, although primed by bus 2, is note enabled at time $t_2$ and the first convolution (and other odd numbered convolutions) of the disc being played is "skipped" or ignored by the scan generator. In this way, each line of the displayed image will correspond to a segment of every other convolution of the disc. The effective vertical field of view may be determined by multiplying the number of raster lines skipped (M) by the total number of raster lines generated which, as will be explained, is inversely related to N.

At time $t_3$ the second interruptor pulse ("2" of waveform A) causes divider 13 to supply an enabling signal to gate 15 and then reset itself. The pulse at the output of gate 15 (waveform C) triggers multivibrator 16 to assume its quasi-stable state whereupon bus 3 assumes a high level (waveform D, $t_3$–$t_6$). This sets flip-flop 20 and causes pulse synchronizer 19 to produce eight timing pulses (waveform E at $t_3$–$t_4$) whereupon counter 31 and decoder 32 reset flip-flop 20 as previously described.

The timing pulses are counted or "integrated" by counter 31 and converted to an analog voltage by converter 34 to thereby produce a staircase voltage ramp (waveform F, times $t_3$–$t_4$) which is applied to the vertical input circuit (Y-axis) of oscilloscope 202 via amplifier 61 and attenuator 62.

Pulse synchronizer 17 is also enabled at time $t_3$ to supply pulses to counter 51 so that a delayed pulse (waveform G) is produced by counter 51 at time $t_5$. This pulse is used to initiate horizontal sweep and unblanking of oscilloscope 202 a sufficient length of time, T, after $t_3$ to allow counting the N pulses and to allow the D/A converter to settle. The delay, T, provided by counter 51 in this example is 25.6 microseconds (256 cycles of the 10 MHz oscillator). As previously explained, delaying the start of horizontal sweep minimizes distortion of the image. Also, one may vary the delay time T, if desired, to effect a change in the horizontal position of the image relative to the fiduciary marker (flag) 104 on the turntable 102.

When counter 51 triggers multivibrator 52 at time $t_5$ a pulse is produced (waveform H, times $t_5$–$t_7$) which causes ramp generator 55 to supply a sawtooth horizontal (X-axis) sweep voltage (waveform I) and blanking amplifier 54 to supply an unblanking voltage to the oscilloscope 202. This completes the generation of one step of vertical sweep voltage and one horizontal sweep whereby the first line of the raster is formed.

It is instructive to note in FIG. 3 that waveforms D and H overlap in the time period $t_5$–$t_6$. The purpose of this overlap is to inhibit gate 47 throughout the scanning process until the last raster line scan is complete. As an illustration, it has been assumed that counter 31 is a 10 bit counter. Its maximum count (all ones) is 1023. Since pulse generator 10 produces 8 pulses per burst, counter 31 will reach full scale (all ones) after 128 lines have been scanned and detector 33 will supply a priming (high level) signal to gate 47 at the beginning of the last line. However, gate 47 will be inhibited by the output (D) of multivibrator 16 in the interval $t_3$–$t_6$ and inhibited by the output of multivibrator 52 (waveform H) during the interval $t_5$–$t_7$. Accordingly, gate 47 is only enabled upon the return of multivibrator 52 to its stable state (e.g., $t_7$). after the last line is completed. At that time, flip-flop 42 will be reset, the oscilloscope will be blanked and the shutter of camera 204 will be closed.

What is claimed is:

1. Apparatus for producing a raster scanned image of a predetermined area of the signal surface of a video disc, said apparatus comprising:
    video disc player means including a turntable for rotating said video disc and pickup transducer means for producing an output signal representative of an information track of said disc;
    turntable rotation sensing means mounted on said player means in a position proximate to said turntable for producing a signal manifestation corresponding to each revolution of said turntable;
    scan generator means responsive to said signal manifestation of said sensing means and to the output signal of said transducer means for producing a raster scan signal manifestation of a selected area of said video disc;
    image display means responsive to said raster scan signal manifestation for producing a raster scanned image of said selected area; and
    circuit means in said scan generator means for controlling the raster line resolution in accordance with a first control signal manifestation and for controlling the effective field of view of said raster scanned image in accordance with a second control signal manifestation.

2. Apparatus as recited in claim 1 wherein said circuit means comprises:
    pulse generator means responsive to the signal manifestation produced by said sensing means for producing a burst of N timing pulses within a period of time, T, for each M revolutions of said turntable, N being controllable in accordance with said first control signal manifestation, M being controllable in accordance with said second control signal manifestation, T being less than the rotational period of said turntable;
    sweep generator means including integrator means for producing an analog output voltage proportional to the number of timing pulses produced by said pulse generator means and limiter means for limiting said output voltage to a predetermined value;
    control means responsive to activation of said limiter means for inhibiting said pulse generator means and resetting said integrator means to a predetermined initial condition; and
    means for applying said analog output voltage as a portion of said raster scan signal manifestation to said image display means.

3. Apparatus as recited in claim 2 wherein said limiter means includes an output node for producing a limit signal when said output voltage of said sweep generator means reaches said predetermined value and wherein said control means comprises:
    memory means having first and second states;
    means for applying a control signal to said memory means for placing said memory means in said first state;
    means for deriving an output signal manifestation from said memory means and applying said output signal manifestation as an enabling signal manifestation to said pulse generator means and said integrator means when said memory means is in said first state and for applying said output signal manifestation as an inhibit signal manifestation to said pulse generator means and as a reset signal manifestation to said integrator means when said memory means is in said second state; and
    means for applying said limit signal to said memory means for placing said memory means in said second state.

4. Apparatus as recited in claim 3 further comprising delay means coupled to said memory means for delaying a change from said first state to said second state.

5. Apparatus as recited in claim 2 wherein:
    said resettable integrator means comprises counter means having input means for receiving said timing pulses, output means for providing a digital manifestation of the number of timing pulses counted and digital to analog converter means responsive to said digital manifestation for producing said analog output voltage; and wherein
    said limiter means comprises means for supplying a control signal of a first level to said counter means when said output voltage is less than said predetermined value for enabling said counter means to count said timing pulses and for changing said control signal to a second level when said output voltage equals said predetermined value for inhibiting counting of said timing pulses by said counter means.

6. Apparatus as recited in claim 5 further comprising:
    calibration means responsive to a calibration control signal supplied thereto for causing said digital signal manifestation supplied to said digital to analog converter means to assume a predetermined condition corresponding to a full scale calibration level of said analog output voltage.

7. Apparatus as recited in claim 2 wherein said signal manifestation produced by said turntable rotation sensing means comprises a single output pulse for each revolution of said turntable and wherein said pulse generator means comprises:
    programmable divider means for producing a single trigger pulse for each M ones of said output pulses; and
    programmable burst generator means responsive to each of said trigger pulses for producing a burst of N ones of said timing pulses, N being at least unity.

* * * * *